Figure 1:
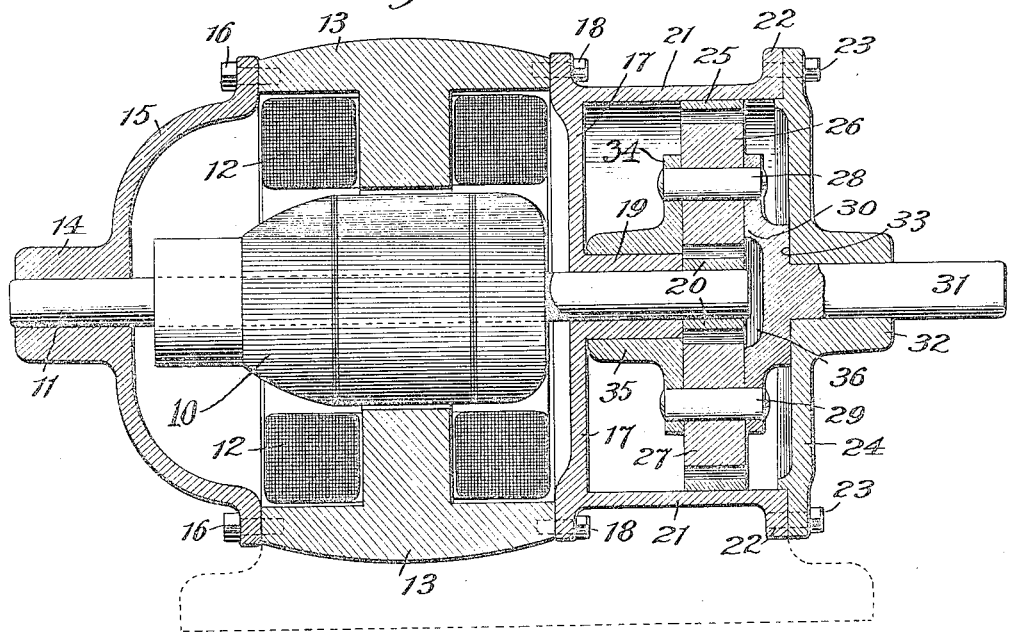

J. A. SHEPARD.
MOTOR AND GEARING THEREFOR.
APPLICATION FILED FEB. 7, 1914.

1,213,427.

Patented Jan. 23, 1917.

Witnesses
Jas. E. Hutchinson
E. L. Greenewald

Inventor
James A. Shepard,
By Foster, Freeman, Watson & Coit,
Attorneys

UNITED STATES PATENT OFFICE.

JAMES A. SHEPARD, OF MONTOUR FALLS, NEW YORK.

MOTOR AND GEARING THEREFOR.

1,213,427.  Specification of Letters Patent.  Patented Jan. 23, 1917.

Application filed February 7, 1914. Serial No. 817,343.

*To all whom it may concern:*

Be it known that I, JAMES A. SHEPARD, a citizen of the United States, and resident of Montour Falls, county of Schuyler, State of New York, have invented certain new and useful Improvements in Motors and Gearing Therefor, of which the following is a specification.

My invention relates to electric or other types of motors that have a relatively high rotative speed and in the application of which to ordinary uses it becomes desirable to reduce such rotative speed within the motor itself before delivering its power to a driven element.

With many types of motors such as electric or steam turbine motors, for instance, the amount of power which can be developed within a given space, the actual efficiency with which the energy is transformed and the weight of the motor of given power are all directly proportional to the rotative speed of the driving element of the motor, hence, it is of great advantage when the rotative speed is made as high as is practicable. On the other hand, it is frequently desirable that the high rotative speed of the driving element of the motor be considerably reduced before the power developed by it is delivered to the driven element. It is also found to be of great importance that the mechanism for reducing the rotative speed of the driving element of the motor occupy the least amount of room which is practicable, since unless the speed reducing mechanism of the motor occupies only a small space there will be no increase in power possible within a given space by a high speed motor equipped with a speed reducing mechanism over that which might be obtained from a slow speed motor. It is also necessary in order to maintain a high efficiency to provide an effective means for lubricating the speed reducing mechanism.

Accordingly, one of the objects of my invention is to provide means for reducing the rotative speed of the driving element of a motor with the least practicable loss of room or of the energy developed and by means which will cause the least variation practicable from the conventional form of such motor and thus present no difficulties in the way of its application to various uses in any suitable manner.

Figure 2:
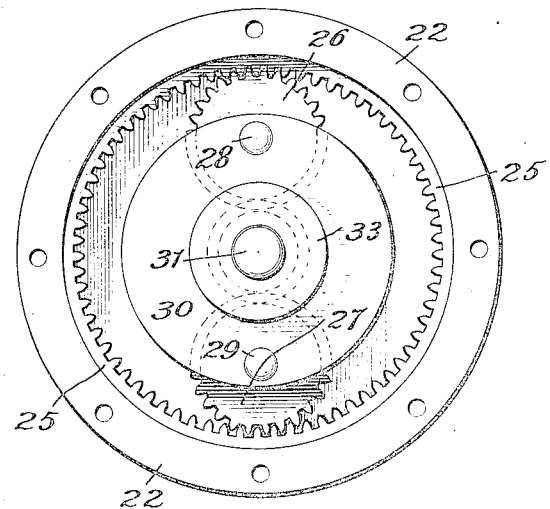

Other objects and the novel features of the invention will be apparent from the following description taken in connection with the drawing, in which:

Figure 1 is a sectional elevation illustrating an electric motor embodying an application of my invention. Fig. 2 is an end view of the mechanism shown in Fig. 1 with the cap or head of the gear case removed.

Referring to the drawing the part 10 constitutes the driving or moving element and in the present disclosure comprises the rotor or armature of an electric motor. The armature is mounted upon the shaft 11 and through the latter transmits the power developed to the gearing to be described. The armature rotates in the field produced by the field coils 12, 12 supported on the field frame 13, which latter surrounds the armature. At one of its ends the shaft 11 is supported for rotation in a bearing 14 which is formed integral with an end shield 15 bolted to one side of the field frame 13 by means of bolts 16. The cover plate 17 is bolted to the other end of the field frame 13 by means of the bolts 18, 18 and forms with the field frame 13 and end shield 15 an inclosing casing for the motor. A boss 19 is formed integral with the cover 17 and is adapted to receive and act as a bearing for the motor shaft 11, which latter extends beyond the end of the boss and has a driving pinion or sun gear 20 keyed at the outer end thereof. A circular part or flange 21 which constitutes the circular peripheral wall of a gear case is cast integral with the cover 17 near the marginal edge of the latter. The wall 21 is formed at its free outer edge with a flange 22 bored to receive bolts 23 to fasten a gear case cover 24 to said wall 21.

A circular rack or orbit gear 25 is secured to the inner surface of the wall 21 and forms a continuous bearing surface for the planetary gears 26 and 27 which mesh therewith and with the pinion 20 on the drive shaft. The gears 26 and 27 are mounted for rotation on the planet pins 28 and 29. The pins 28 and 29 are supported at one end on the circular head 30 formed on the end of and integral with the driven member or shaft 31 which has a bearing adjacent the head thereof in the boss 32 formed integral with the gear case cover 24. A shoulder 33 is formed on the head 30 and by engagement with the inner face of the cover 24 limits the outward movement of the driven shaft 31. The other ends of the pins 28 and 29 are supported in the flange 34 of a bearing member or hub portion 35 which fits over the boss 19 and has bearing on the outer surface of the latter and concentric with the shaft 11. The end of the part 35 may abut against the end wall 17 to limit the movement of the driven shaft. The bearing member 35 constitutes an extension of the head 30 and shaft 31 and may be formed integral therewith, leaving only the necessary recesses in the head 30 to receive the planet gears 26 and 27 thus forming a carrier for said planet gears. The head 30 of the driven shaft is recessed slightly as at 36 so as to allow for slight end play of the two shafts 11 and 31 which are in line with each other. In the arrangement disclosed the end of the driven shaft has its bearing on the exterior of the bearing for the driving shaft and telescopes over the latter, forming a very compact reduction gearing. By means of the planetary gearing consisting of the pinion 20, planet gears 26 and 27 and stationary internal gear 25 the relatively rapid rotation of the motor shaft 11 is transmitted at a reduced speed to the driven shaft 31 and therefore the power developed by the motor instead of being taken from the motor at a relatively high rotative speed by means of a band wheel, pinion or other means mounted upon the projecting end of the shaft 11 is taken at a reduced speed from the projecting end of the shaft 31. The field frame as well as the gear case are stationary and may, if desired, be supported on a suitable base as is shown in dotted lines.

The construction admits of the use of planetary gearing and the application of the invention to the conventional form of motor and merely requires the substitution of the end plate 17 for the ordinary end plate of the motor and does not necessitate changing the position of its driving shaft.

In order to realize the high efficiency resulting from operating the shaft 11 at a high speed it is also necessary that the frictional losses of the gearing and the several bearings be reduced as much as possible. This result is accomplished by partially filling the casing formed for the gearing with a suitable lubricant, by means of which the moving parts are constantly bathed. The lubricant fulfils the further important mission of reducing the noise created by the gearing.

While the invention has been shown as applied to an electric motor I do not wish to restrict its application to electric motors but contemplate its application to the steam turbine or any other type of motor. Neither is the invention restricted to such applications as may require a reduction of speed but its application is contemplated to a reversal of the conditions here shown in which it is desired to increase the speed of the driven element over that of the driver.

Having described my invention what I claim and desire to secure by Letters-Patent is, 1. The combination of a gear case having openings in opposite walls thereof, a driving shaft, a driven shaft axially in line with said driving shaft, said shafts extending into said gear case through said openings, a boss on one of said walls and surrounding one of said openings, said boss projecting into said gear case and having interior and exterior bearings thereon, one of said shafts being supported on said interior bearing, means for supporting the other shaft on said exterior bearing, and gearing in said gear case connecting the driving shaft and driven shaft.

2. The combination of a gear case having openings in opposite walls thereof, a driving shaft, a driven shaft axially in line with said driving shaft, said shafts extending into said gear case through said openings, a boss on the inside of one of said walls and surrounding one of said openings, said boss having an exterior bearing surface, means for supporting one of said shafts on said bearing surface, and gearing in said gear case connecting said driving shaft and driven shaft.

3. The combination of a gear case having openings in opposite walls thereof, a driving shaft, a driven shaft axially in line with said driving shaft, said shafts extending into said gear case through said openings, a boss on the inside of one of said walls and surrounding one of said openings, said boss having an exterior bearing surface, a planet gear carrier on one of said shafts having a hub portion supported on said exterior bearing, planet gears mounted on said carrier, a sun gear on the other shaft, and an orbit gear supported by the gear case, said sun gear and orbit gear meshing with the planet gears.

4. The combination with a motor, of a casing therefor, a gear case, said gear case and motor casing having a common partition wall provided with an opening extending therethrough, a boss surrounding said opening, said boss projecting into the gear case and being provided with interior and exterior bearing surfaces, a motor shaft extending through said opening into said gear case and supported on said interior bearing surface, a driven shaft coaxial with the motor shaft and terminating in said gear case, means for supporting the driven shaft on said exterior bearing surface, and speed-reducing gearing in said gear case for connecting the motor shaft and driven shaft.

5. The combination of a motor casing, a gear case secured to the motor casing, one end wall of said gear case constituting an end wall for the motor casing and having an opening therethrough, a boss surrounding the opening in said wall and projecting into the gear case, said boss having interior and exterior bearings thereon, a motor shaft extending through said opening into said gear case and supported on said interior bearing, a sun gear mounted on the inner end of said motor shaft, an orbit gear mounted in the gear case, a driven shaft coaxial with the motor shaft and terminating in said gear case, a planet gear carrier on said driven shaft having a hub portion supported on said exterior bearing, and planet gears mounted on said carrier and meshing with said sun gear and orbit gear.

6. In gearing, the combination of a motor, a casing inclosing said motor and having an opening in one of its walls and two concentric bearings disposed about said opening on the outer side of said wall, a motor shaft extending through said opening and supported near its end by one of said bearings, a driven shaft supported by the other bearing and coaxial with said motor shaft, the end of the motor shaft fitting within the end of the driven shaft, speed-reducing gearing connecting said shafts, and a housing inclosing said gearing, bearings and the ends of said shafts.

In testimony whereof I affix my signature in presence of two witnesses.

JAMES A. SHEPARD.

Witnesses:
  A. G. CLARK,
  B. D. EDWARDS.